United States Patent
Weber et al.

(10) Patent No.: US 6,834,187 B1
(45) Date of Patent: Dec. 21, 2004

(54) METHOD OF DEVISING A FREQUENCY PLAN FOR A SIGNAL ANALYSIS CIRCUIT

(75) Inventors: Leonard Weber, Bodega Bay, CA (US); Neus Padros, Santa Rosa, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 149 days.

(21) Appl. No.: 10/235,323

(22) Filed: Sep. 5, 2002

(51) Int. Cl.[7] .............................. H04B 1/04; H04B 1/06; H04B 7/00; H01Q 11/12
(52) U.S. Cl. ........................ 455/424; 455/113; 455/118; 455/260; 455/265; 455/317
(58) Field of Search .................................. 455/254, 266, 455/295, 296, 303, 304, 307, 183.2, 165.1, 186.2, 76, 85–86, 112–113, 118, 258–260, 264–265, 315–318, 323, 325, 334

(56) References Cited

U.S. PATENT DOCUMENTS

| | | | |
|---|---|---|---|
| 4,551,856 A | * 11/1985 | Victor et al. | ............. 455/183.2 |
| 5,230,094 A | * 7/1993 | Kitching et al. | ......... 455/183.2 |
| 5,325,221 A | 6/1994 | Van der Tol | |
| 5,794,131 A | 8/1998 | Cairns | |
| 5,890,051 A | 3/1999 | Schlang et al. | |
| 5,970,105 A | * 10/1999 | Dacus | ........................ 375/344 |
| 6,308,065 B1 | 10/2001 | Molinari et al. | |
| 6,501,944 B1 | * 12/2002 | Szydlowski et al. | ........ 455/266 |
| 6,522,177 B1 | * 2/2003 | Spampinato | ................ 327/107 |
| 6,549,153 B2 | * 4/2003 | Eriksson et al. | ............ 341/144 |
| 6,671,500 B2 | * 12/2003 | Damgaard et al. | .......... 455/118 |

\* cited by examiner

*Primary Examiner*—Binh Tieu

(57) ABSTRACT

A frequency plan for a signal analysis circuit includes operational parameters that are selected on the basis of first intermediate frequency (IF) filtering characteristics that are uniquely identified for the circuit. That is, rather than selecting a frequency plan based upon an original design of the circuit and circuit layout, actual IF filtering characteristics are considered. The center frequency of the passband of the first. IF filter may be measured and then used as an important factor, along with inhibiting spurious responses, in a devising the frequency plan for the specific circuit.

19 Claims, 5 Drawing Sheets

METHOD OF DEVISING A FREQUENCY PLAN FOR A SIGNAL ANALYSIS CIRCUIT

TECHNICAL FIELD

The invention relates generally to circuits for performing signal analysis and more particularly to methods of determining operational parameters for such circuits.

BACKGROUND ART

Signal analysis instruments are used in designing and testing individual components and completed systems. One conventional signal analysis instrument is the oscilloscope, which may be used to determine measurements of signal variations as a function of time. Signal analysis in the time domain provides useful information, but frequency-domain analysis is at least equally important in some situations. For example, telecommunications systems which use Frequency Division Multiplexing (FDM) techniques may be more thoroughly tested by using instruments which yield frequency domain information. Spectrum analyzers are often used to acquire frequency-domain measurements relating to levels of modulation, distortion and noise.

In a spectrum analyzer having one frequency conversion to a lower frequency level, the test signal to be analyzed is connected as one input to a mixer of the instrument. At the mixer, the test signal is combined with the signal of a local oscillator (LO), so as to provide an output at an intermediate frequency (IF). The IF is the tuned frequency of the analyzer. The down converted signal is propagated through an IF filter. The filter output provides a measure of the presence of a signal component at the analyzer's tuned frequency. In order to improve performance and/or capability, some instruments include two frequency conversions. The filtered output of the first IF filter is an input to a second mixer, which has a second input from a second local oscillator. As a result, a second IF is provided at the output of the second mixer. Merely as one example, the first IF may be 3245 MHz (3.245 GHz), while the second IF may be 135 MHz. Thus, a "frequency plan," which defines internal operational parameters of a circuit, will be defined in accordance with the original circuit design that includes the two IFs to which the test signal is converted.

An important element of a circuit that includes one or more conversions to a final IF is the first IF filtering. In a multi-conversion circuit, the first IF filtering needs to provide high frequency selectivity, so as to reject image signals before they reach the second conversion. Each mixer will include a number of different signals at its output. In addition to outputting the two signals being mixed, the available mixer output signals include the sum frequency signal and the difference frequency signal. While not critical, the center frequency of the passband of the IF filter following a mixer is typically the difference frequency signal of the mixer.

A number of filtering techniques have been used to provide the first IF filtering. For example, cavity resonators and dielectric resonators have been used. Another approach is to use printed stripline interdigital filters, since such filters provide the desired high selectivity without introducing an unacceptable level of loss. The concern with printed stripline interdigital filters is that there are significant differences in the filtering characteristics of such filters from one fabrication lot to the next, and even in the same fabrication lot. Significant variations in the filtering characteristics may lead to a reduction in the fabrication yield, since some fabricated circuits may not reach minimum quality control standards. Moreover, while other fabricated circuits may satisfy quality control requirements, the performance may be less than optimal.

What is needed is a method for controlling the effects of circuit-to-circuit variations in the filtering characteristics of signal analyzer circuitry having input signal frequency conversion,

SUMMARY OF THE INVENTION

Frequency-related operational parameters of a signal analysis circuit having frequency conversion are selected on the basis of factors that include intermediate frequency (IF) filtering characteristics that are uniquely identified for the circuit. By tailoring a frequency plan to the actual IF filtering characteristics, rather than the target IF filtering characteristics of the circuit designer, a circuit may be used even when there is a significant difference between actual and target IF filtering characteristics. Consequently, rather than discarding a circuit board that does not meet specifications, a frequency plan may be individualized to enable passage of the desired signal components while inhibiting passage of externally generated and internally generated spurious responses.

In a typical application of the invention, the circuit of concern includes at least two frequency conversions. As one example, the circuit may be formed as a printed circuit board for a spectrum analyzer that uses heterodyne techniques. However, other applications of the invention are contemplated.

In a first step, a signal analysis circuit design and printed circuit board layout are selected. At least one circuit is fabricated in accordance with the design and layout. Typically, a number of such circuits are fabricated, either in a single lot or a number of different lots. The circuit may include first and second frequency conversions to first and second intermediate frequencies, respectively, with a first IF filter between the two conversions.

Each signal analysis circuit is tested to determine the actual IF filtering characteristics of the first IF filter. A particularly important characteristic is the center frequency of the passband defined by the filter.

With the identification of the IF filtering characteristics, the frequency plan for the circuit may be selected. For example, a circuit having two frequency conversions may be set according to the equations: $LO_1 = RF + IF_1$ and $LO_2 = IF_1 \pm IF_2$, where $LO_1$ and $LO_2$ are the frequencies of the local oscillators for the conversions, $IF_1$ and $IF_2$ are the two intermediate frequencies that result from the conversions, and RF is the input signal under test.

A simplified frequency plan does not consider externally generated spurious responses, which are often referred to as crossing spurs. Crossing spurs are due to nonlinearities inherent in receiver components, such as mixers and amplifiers. A high performance signal analysis circuit considers crossing spurs in selecting a frequency plan. Crossing spurs can be calculated using the equations $IF_2 = \pm M*IF_1 \pm N*LO_2$ and $IF_2 = M*IF_1 \pm N*LO_2$. The crossing spurs may be avoided within the output of the signal analysis circuit by selecting a frequency plan that inhibits low order products.

Internally generated spurious responses are more problematic. Such spurious responses are often referred to as residuals, since they are present with the termination of the input signal to the circuit. While crossing spurs are loosely specified, residuals are often tightly specified. Within the selected frequency plan, the operational parameters of the second conversion can be designed to avoid residuals by using the high side or the low side of the IF, depending on the position of the residual. Often, this can be accomplished by flipping the conversion so as to avoid residuals. The residuals can be located by the equation $IF=\pm M*LO_1 N*LO_2$. Then, the frequency of the second local oscillator may be established according to the equation $LO_2=IF_1+IF_2$ or $LO_2=IF_1-IF_2$. This may be less than a ten percent change in the frequency of the second local oscillator, which is unlikely to cause a reduction in other aspects of signal analysis performance.

For circuits that use fractional-N synthesizers for controlling local oscillators, spurious responses are generated whenever the phase accumulator of the synthesizer completes a cycle. A loop bandwidth of approximately 10 KHz will be considered. Any spurious response generated outside of the loop bandwidth of a fractional-N synthesizer will have some attenuation, assuming power supplies are adequately filtered. These "structure" spurs are preferably outside the bandwidth by a minimum of 50 KHz. The structure spurs occur when the .f numbers are near integer values. For example, for a .f of 0.002, a structure spur will occur every 1/0.002 cycles, or 500 cycles. With a reference signal of 20 MHz for the synthesizer, the spur frequency would be (0.002) (20 MHz)=40 KHz. To achieve the 50 KHz minimum, .f values of less than 0.0025 and greater than 0.9975 should be avoided. This can be accomplished by moving the frequencies of the first and second local oscillators by a small amount when the .f values to be avoided are reached.

An advantage of the invention is that there is a reduction in the number of situations in which a circuit needs to be redesigned or a fabricated printed circuit board needs to be replaced. Following circuit fabrication, the center frequency of the first IF filter may be identified by stepping the frequencies of the local oscillators and monitoring the output of the circuit. After the center frequency is identified, the characteristics of spurious responses may be determined. As one possibility, a spur calculation program may be used to identify the high/low switch points relevant to the frequency plan for the second conversion. The calculated switch points can then be stored in memory, such as by non-volatilely storing the data into flash memory. By uniquely identifying IF, for each circuit, it is possible to calculate target frequencies for avoiding spurious responses. Crossing spurs can then be predicted and measured in order to verify specifications.

BEST MODE FOR CARRYING OUT THE INVENTION

Figure 1:
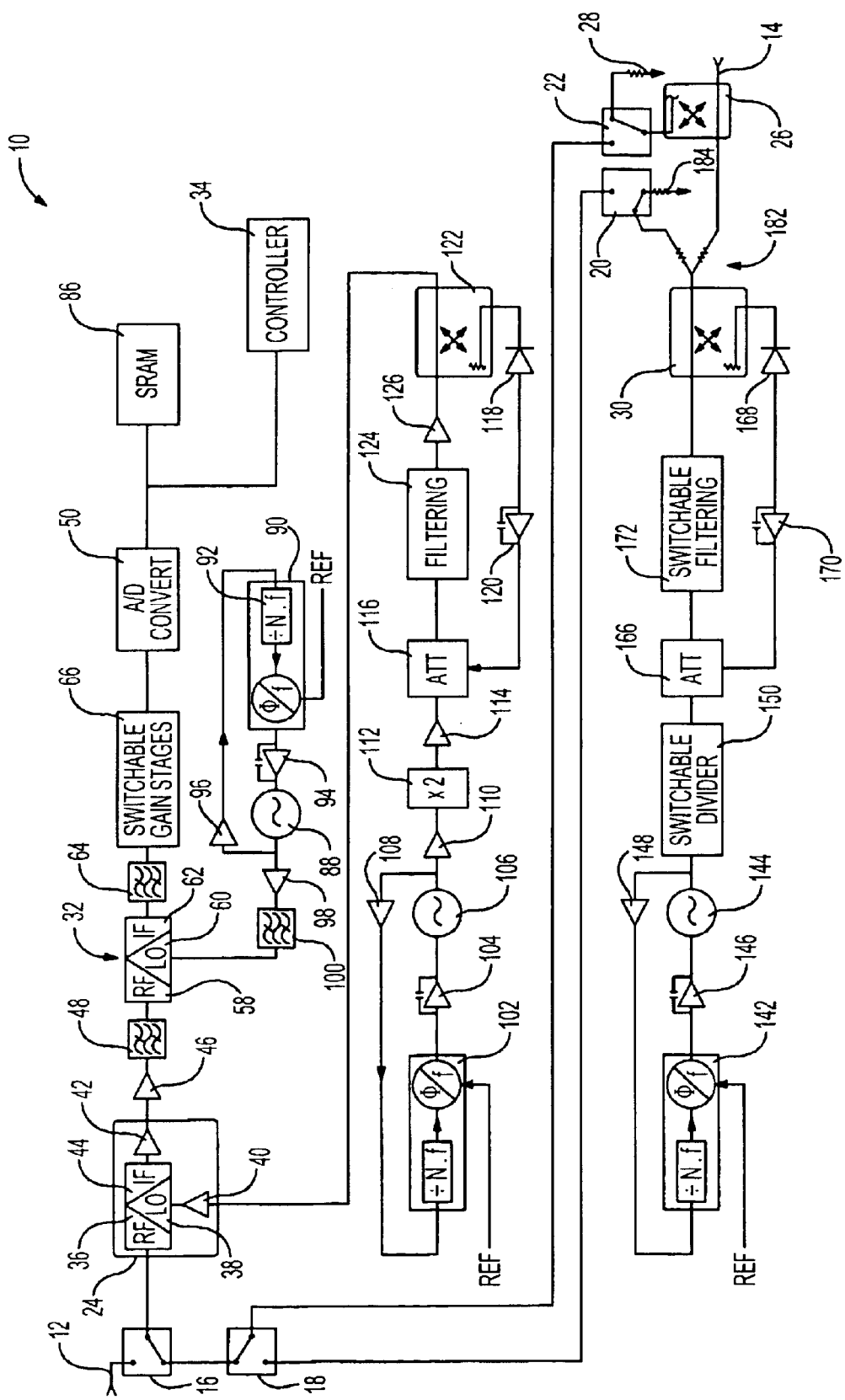
FIG. 1 is a block diagram of components of a signal analysis circuit which provides flexible frequency synthesis for enabling the present invention.

With reference to FIG. 1, an example circuit 10 is shown for use in the present invention. The circuit may be a super heterodyne spectrum analyzer having two frequency conversions with fixed IF filtering. One possible use of the invention is to provide portable base station testing in a wireless communication network. Various types of cellular base station testing are known in the art. For example, U.S. Pat. No. 6,308,065 to Molinari et al., which is assigned to the assignee of the present invention, discloses techniques for performing parametric receiver measurements. To be described below is an adaptive approach to providing a frequency plan in order to accommodate center frequency variations of high selectivity filters, such as the ones required for test receivers. The adaptive approach may be applied to circuits and to testers other than the one that will be described with reference to FIGS. 1–6. The significant common feature among potential applications of the invention is the desire to establish a frequency plan that is tailored to actual filtering characteristics, rather than perceived or intended filtering characteristics.

In FIG. 1, many of the elements which are not necessary to understand the invention have been omitted in order to reduce the complexity of the diagram. While specific frequencies will be described when referring to FIG. 1, the frequencies will vary with the application. The circuit 10 includes an input port 12. Depending upon the states of a number of switches 16, 18, 20 and 22, the frequency conversion path of the circuit will be connected to the input port 12, an output port 14, or a reference input. In FIG. 1, the illustrated states of the switches dictate that the frequency conversion path is isolated from any of a number of other paths. Merely by changing the state of the first switch 16, the input port 12 will be connected to a mixer chip 24 that provides the first frequency conversion. Alternatively, from the condition shown in FIG. 1, switching the state of the fourth switch 22 connects the output port 14 to the mixer chip 24. A signal from the output port 14 is coupled to the switch 22 by a directional bridge 26. The switch 22 is an isolation switch that is shown as being connected to a resistor 28, but which connects the signal from the directional bridge 26 to one input of the second switch 18 when the fourth switch 22 is toggled. Finally, the "reference mode" of the circuit can be selected by changing the states of the second switch 18 and the third switch 20, thereby connecting a signal from a directional coupler 30 to the input of the mixer chip 24.

The frequency conversion path of the circuit 10 includes two frequency conversions, which are provided by the mixer chip 24 and a second mixer 32. "Mixer" is defined broadly herein as any of a variety of components or arrangements of cooperative components which achieve frequency conversion, or translation. While not shown in FIG. 1, the path typically would include an attenuator that precedes the mixer chip 24. The attenuator is used to adaptively limit the power of the input signal, so as to reduce the risk of damage to the components of the circuit. A controller 34 includes digital signal processing (DSP) for automatically manipulating the attenuator. The path section between the first switch 16 and the mixer chip 24 may also include at least one gain stage and at least one filter having filtering characteristics selected on the basis of the application. For a spectrum analyzer designed to provide base station testing within a telecommunications network, the port 12 may be a receiver input for frequencies in the range of 275 MHz to 2.7 GHz, while the port 14 may be a source output port for frequencies in the range of 275 MHz to 2.7 GHz.

As is well known in the art, the output of a mixer will depend upon the frequencies at a radio frequency (RF) input and a local oscillator (LO) input. For the mixer chip 24, the RF input 36 is connected to receive the signal that is to be analyzed. The LO input 38 receives a tuned frequency input from a first LO path. The mixer chip 24 is shown in FIG. 1 as including a built-in input gain stage 40 and an output gain stage 42. The output gain stage is connected to the IF output 44 of the mixer. Four possible signals are available using a mixer. In addition to the RF and LO signals, the mixer will provide the sum of the two signals (RF+LO) and the difference between the two signals (RF−LO). In spectrum analysis, the difference signal is often the signal that is used in subsequent stages.

Between the mixer chip 24 and the second mixer 32, the signal is amplified at a gain stage 46 and filtered by a first IF filter 48. The filtering characteristics of the first IF filter are significant to the operation of the spectrum analyzer, as previously noted. The first IF filter may be a series of filters or may be two filters separated by a gain stage, but the implementation is not critical to the invention. The first IF filter may be fabricated as a printed stripline interdigital filter, which tends to provide the high selectivity in the application. However, such filters tend to have filtering characteristics that vary significantly from fabrication lot to fabrication lot. As one example, the target center frequency of the passband of the first IF filter 48 may be 3245 MHz, but the actual center frequency of one printed stripline interdigital filter may be 3305 MHz. The passband of the filter may be 20 MHz, so that even a one percent difference between the target center frequency and the actual center frequency (e.g., 3245 MHz×1%=32.45 MHz) will place the actual center frequency outside of the passband for which the circuit was designed. In accordance with the invention, the circuit 10 is used to determine its own first IF center frequency, as for example by stepping the frequencies of the local oscillators and monitoring the response through an analog-to-digital converter 50. After the first center frequency is known, a DSP code may be set within the controller 34 to provide the appropriate local oscillator frequencies on the basis of the detected first IF. In its simplest form, the passage of spurious responses is not considered, so that modifying circuit operation from the target center frequency to the actual center frequency merely uses the equations $LO_1=RF+IF_1$ and $LO_2=IF_1\pm IF_2$. However, circuit performance is significantly enhanced when spurious responses are avoided using the techniques to be described below.

Figure 2:
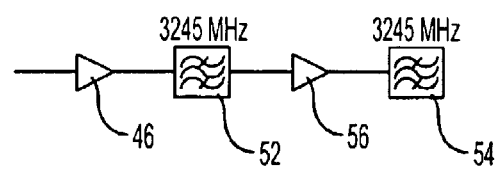
FIG. 2 is a block diagram illustrating one embodiment of the first IF filter of FIG. 1.

The first IF filter 48 is shown as being a single element. However, as will be readily understood by persons skilled in the art, there may be a number of different elements between the mixer chip 24 and the second mixer 32. Referring to FIG. 2, there may be a pair of identical filters 52 and 54 that are separated by a gain stage 56. A target center frequency of 3245 MHz is shown in FIG. 2. However, the actual center frequency may be offset from the target.

The second mixer 32 of FIG. 1 operates in the same manner as the first mixer within the mixer chip 24. Thus, the second mixer includes an RF input 58, an LO input 60, and an IF output 62. A second IF filter 64 is connected to the IF output. One example of a center frequency for the second IF filter is 135 MHz. As with the first IF filter 48, the IF filter 64 may represent a number of components, such as the series arrangement of two gain stages and two filters shown in FIG. 2, where the two filters have a center frequency of $IF_2$, rather than $IF_1$.

Figure 3:
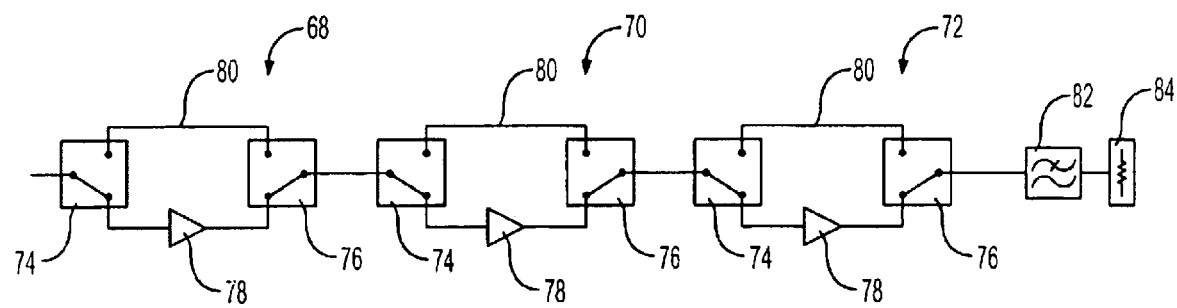
FIG. 3 is a block diagram of one embodiment of the switchablei gain stages of FIG. 1.

Following the second IF filtering, the twice-converted signal reaches switchable gain stages 66. FIG. 3 shows one embodiment in which there are three such stages 68, 70 and 72, with each stage including a pair of switches 74 and 76 that determine whether a signal will propagate through an amplifier 78 or through an amplification-free path 80. At the output of the third switchable stage 72 is another filter 82 that leads to an attenuator 84. The attenuator is controlled by operation of the DSP within the controller 34 of FIG. 1. Static random access memory (SRAM) 86 is shown for supporting operations of the controller.

The signal at the LO input 60 of the second mixer 32 is generated by an oscillator 88, which is controlled by a fractional-N synthesizer 90. The operations of these components are well known in the art. The oscillator 88 is a voltage controlled oscillator (VCO) and the fractional-N synthesizer 90 uses phase locked loop (PLL) techniques. A fractional-N synthesizer is not restricted to multiples of a divider 92. Traditional frequency dividers only produce integer divide ratios (N/M). However, a fractional-N synthesizer enables the divide number to be a fractional divide number. In FIG. 1, N.f signifies the fractional divide number and 'REF' signifies a phase locked loop reference frequency. Merely for example, the reference frequency may be 10 MHz.

One concern with the use of fractional-N synthesizers is that they tend to generate spurious responses when the phase accumulator shifts. For a loop bandwidth of approximately 10 KHz, any spurious response outside of the range produced by the fractional-N synthesizer will have some attenuation, assuming power supplies are adequately filtered. Ideally, these "structure" spurious responses are moved outside the loop bandwidth to at least 50 KHz. The structure spurious responses occur when the .f numbers approach integer values. For example, a .f of 0.002 would provide spurious responses every 1/0.002 cycles, or 500 cycles. With the reference of 20 MHz (rather than the reference of 10 MHz of FIG. 1), spurious responses would be generated at a frequency of (0.002) (20 MHz)=40 KHz. To achieve a spurious response frequency of greater than 50 KHz, the .f value would need to remain above 0.0025 and below 0.9975. In a frequency plan in accordance with the invention, the LO input 60 of the second mixer 32 could have a frequency ($LO_2$) that is shifted by a small amount when the .f value reaches the undesired range.

The output of the fractional-N synthesizer 90 may be considered to be an "error signal." This signal is received at a loop amplifier and filter arrangement 94, which is coupled to the input of the VCO 88. The VCO may be a varactor-controlled oscillator having a frequency range of 2.5 GHz to 3.6 GHz. Feedback to the fractional-N synthesizer 90 is through an amplifier 96 in the conventional method.

A gain stage 98 and a filter 100 are shown as being positioned between the VCO 88 and the LO input 60 of the second mixer 32. In practice, the filter 100 may be a series combination of a low pass filter and a high pass filter. For example, the filters may be characterized by frequencies of 3.0 GHz and 4.0 GHz.

The LO input 38 of the mixer of the mixer chip 24 is also generated using a fractional-N synthesizer 102, a loop amplifier and filter arrangement 104, and a VCO 106. The reference signal to the fractional-N synthesizer may be 10 MHz and the input to the synthesizer may be through an amplifier 108 connected to the VCO 106. Within the target frequency plan that has been described thus far, a suitable output for the VCO 106 is 1.5 GHz to 3.0 GHz. The signal is passed through a gain stage 110 to a frequency doubler, so that the available frequency range is actually 3.0 GHz to 6.0 GHz.

At the output of the frequency doubler 112 is a limiting amplifier 114 and an analog-controlled attenuator 116. The control signal for the attenuator is feedback received from a path through a diode detector 118 and a loop amplifier and filter arrangement 120. The feedback path originates at a directional coupler 122 which is positioned between the mixer chip 24 and the circuit elements connected to the attenuator 116. In FIG. 1, these components are shown as merely being a filtering element 124 and an amplifier element 126. However, a more sophisticated arrangement is shown in FIG. 4.

Figure 4:
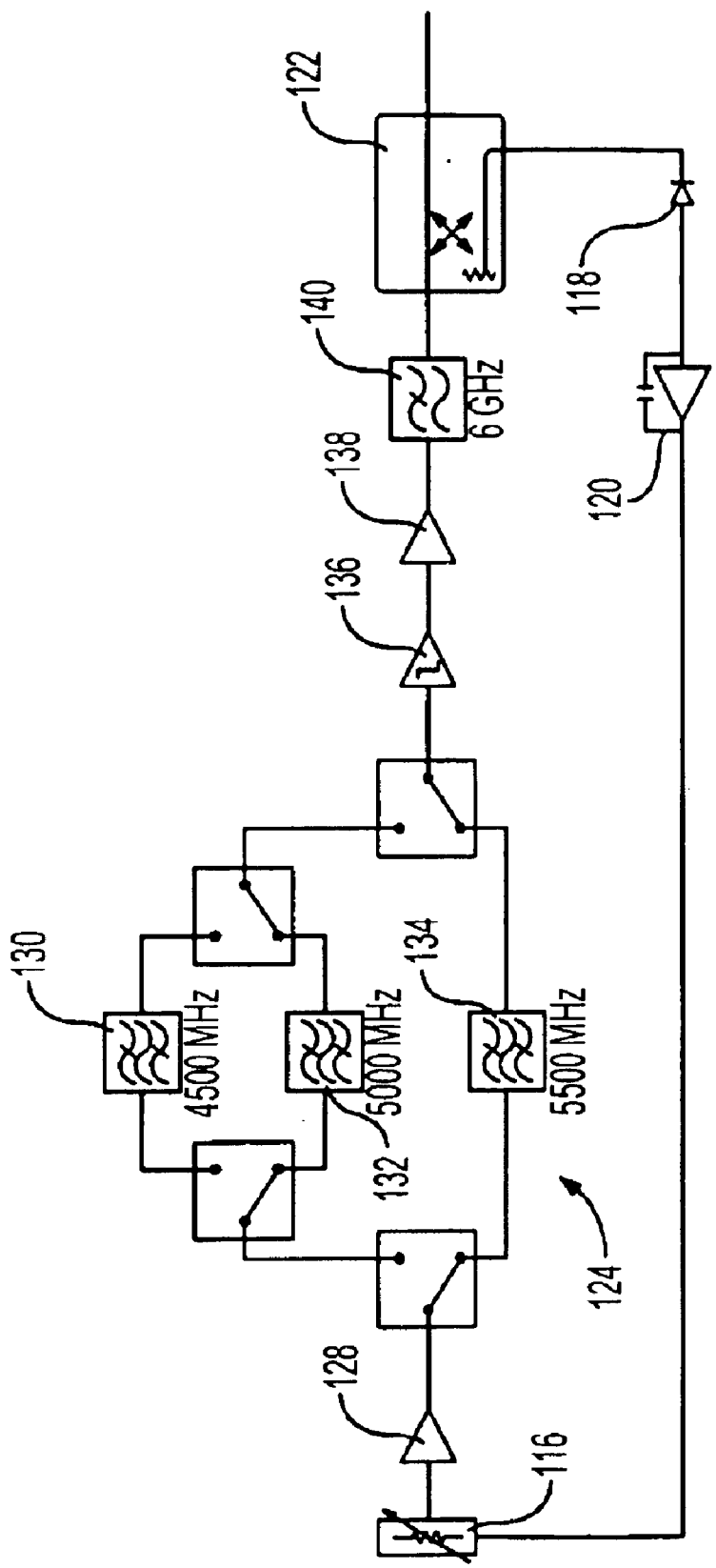
FIG. 4 is a block diagram of one embodiment of the switchable filtering of FIG. 1.

In FIG. 4, the output of the attenuator 116 is coupled to a gain stage 128. Switchable filtering 124 includes three filters 130, 132 and 134 having center frequencies which are selected to allow subharmonic "cleaning" of the LO, signal. The path between the switchable filtering element 124 and the directional coupler 122 includes a limiting amplifier 136, a gain stage 138, and a 6.0 GHz filter 140.

The concerns regarding structure spurious responses generated by the fractional-N synthesizer 90 apply to the operation of the fractional-N synthesizer 102, so that .f values that are near integers are to be avoided in accordance with the invention. The same may be true when the circuit 10 is in the "reference mode" that was previously described. In this mode, a third fractional-N synthesizer 142 affects the RF input of the mixer within the mixer chip 24. Frequency generation may be identical to that described with reference to the LO input of the mixer within the mixer chip 24. Thus, a VCO 144 has a frequency range of 1.5 GHz to 3.0 GHz and is connected at a control end to a loop amplifier and filter arrangement 146 and at an output end to amplifier 148 that provides the input of the synthesizer 142.

Figure 5:
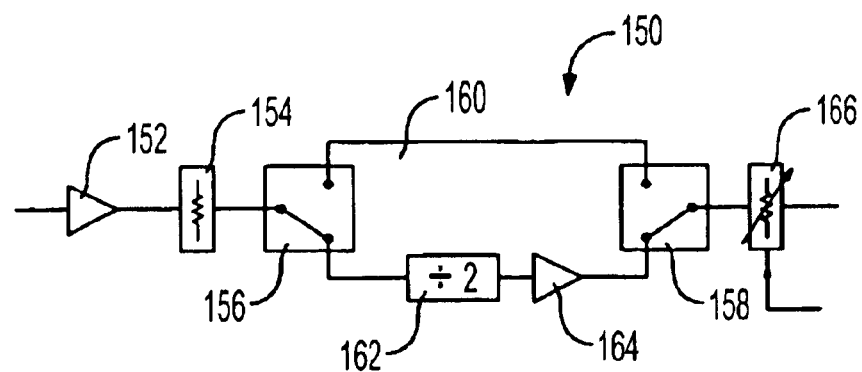
FIG. 5 is a block diagram of one embodiment of the switchable divider of FIG. 5.

While the fractional-N synthesizer 142 cooperates with the VCO 144 in the same manner as the synthesizer 102 and VCO 106, a frequency doubler is not connected to the output of the VCO 144. In fact, a switchable divider 150 may be used. Referring briefly to FIG. 5, the switchable divider 150 may be preceded by a gain stage 152 and an attenuator 154 that is controlled by the controller 34 of FIG. 1. The states of first and second switches 156 and 158 determine whether the signal is conducted through a bypass path 160 or through a divider 162 and amplifier 164. Thus, depending upon the states of the switches, the signal output will be in the range of the original 1.5 GHz to 3.0 GHz or in the reduced range of 0.75 GHz to 1.5 GHz.

Figure 6:
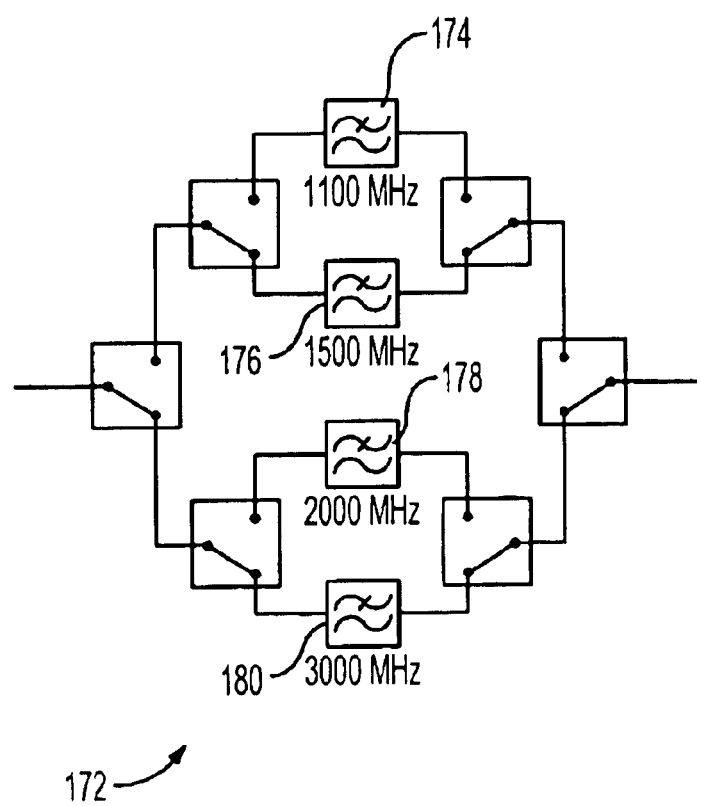
FIG. 6 is a block diagram of one embodiment of the second switchable filtering of FIG. 1.

In FIG. 1, an analog controlled attenuator 166 operates in the same manner as the attenuator 116. The control signal for the attenuator is a feedback path that includes a diode detector 168 and another loop amplifier and filtering arrangement 170. Between the attenuator 166 and the previously identified directional coupler 30 is a switchable filtering arrangement 172 which may be used to provide low pass filtering to remove harmonics. One possible embodiment is shown in FIG. 6. In this embodiment, there are four filters 174, 176, 178 and 180 that can be introduced into or removed from the circuit by manipulating switches.

The output of the directional coupler 30 is connected to a splitter 182. When the switch 20 is changed to the state in which it is no longer coupled to the resistor 184, and the switch 18 is toggled relative to the state shown in FIG. 1, the signal from the directional coupler 30 will provide a direct input to the mixer of the mixer chip 24. In this "reference mode" the condition of the circuit 10 can be checked.

Figure 7:
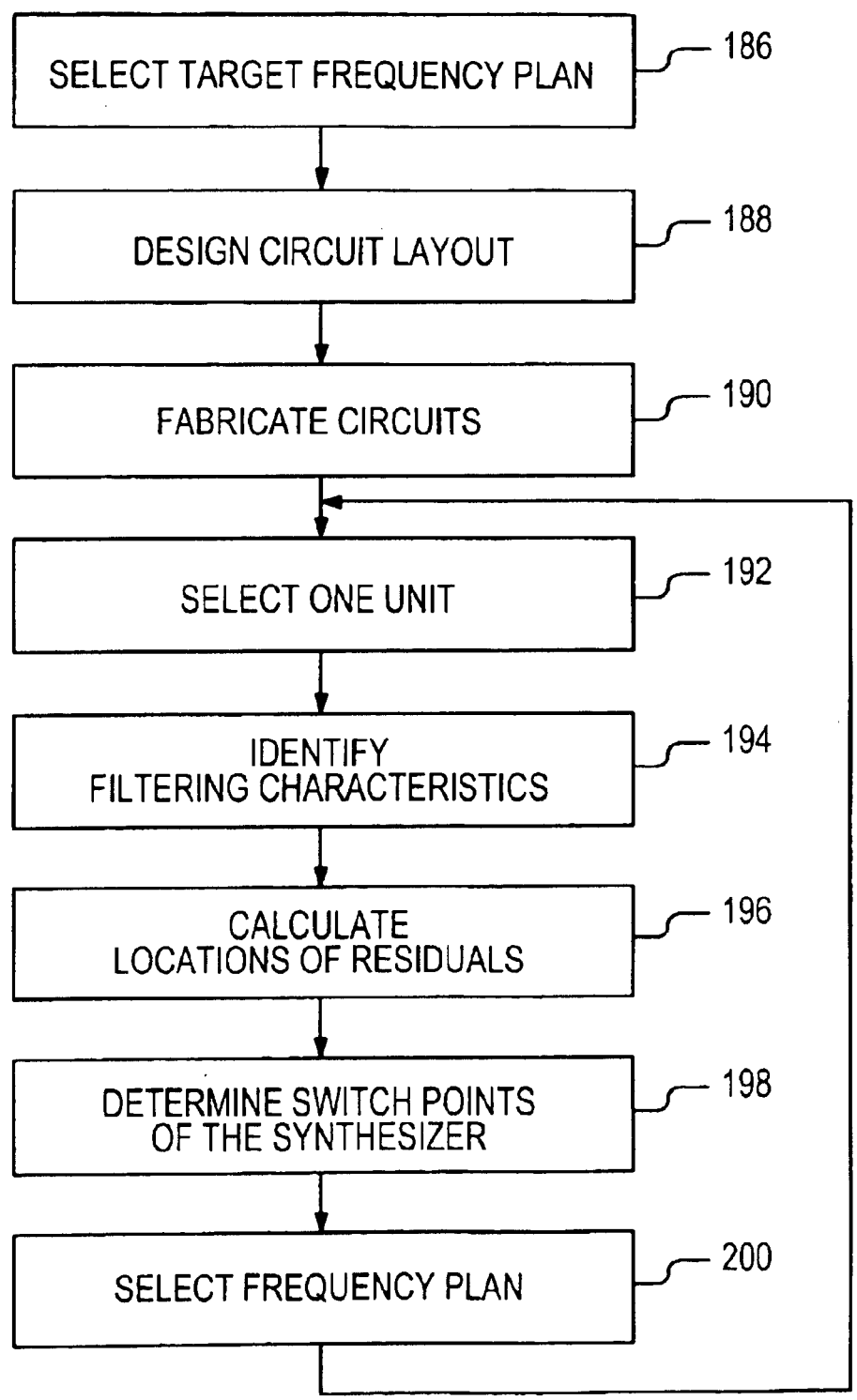
FIG. 7 is a process flow of steps for implementing the adaptive frequency plan in accordance with the invention.

FIG. 7 shows the process flow of steps for the invention. In step 186, a target frequency plan is selected. The frequency plan will depend upon the intended application. For example, the circuit may be a spectrum analyzer for testing base stations of a telecommunications network. However, the process may be used to determine frequency plans for other circuit applications. At step 188, the circuit layout is designed. The design of the first IF filter 48 of FIG. 1 is based on providing high selectivity with regard to the target IF selected at step 186. Any one of a number of different techniques may be used. For example, the first IF filter may be formed using printed stripline interdigital filters.

At least one circuit is fabricated on the basis of the designed circuit layout, at indicated at step 190. The step may be one in which a batch (lot) of circuit boards is fabricated or a number of batches are fabricated over some period of time. In step 192, one unit is selected for testing.

The filtering characteristics of at least the first IF filter 48 are identified at step 194. This step may be performed by stepping the frequencies at the LO inputs 38 and 60, while monitoring the output of the analog-to-digital converter 50. That is, the circuit 10 itself is used to determine the filtering characteristics. As is well known in the art, the signal at the output will reach its peak when the signal at the RF input 36 of the first mixer matches the center frequency of the first IF filter 48.

At this point, the process may skip directly to step 200 of selecting a revised frequency plan. As previously noted, the frequencies of the local oscillators may be selected to be $LO_1=RF+IF$, and $LO_2=IF_1\pm IF_2$. However, more sophisticated frequency plan adjustments are contemplated. For example, crossing spurs should be avoided by selecting a frequency plan so as to inhibit passage of low order products to the output of the circuit 10. Moreover, the locations of residuals can be calculated at step 196, so as to allow residuals to be avoided by selecting the appropriate frequency plan. Propagating residuals through the circuit can be inhibited by selecting the high side or the low side of the IF. Programs which calculate the residuals for high-side mixing and low-side mixing are known in the art. Often, residuals can be avoided merely by "flipping" the conversion. In the execution of the selection of the frequency plan, the residual can be found by using the equation $IF=\pm M*LO_1\pm N*LO_2$. $LO_2$ can then be adjusted to $IF_1+IF_2$ or to $IF_1-IF_2$. In the circuit 10 described with reference to FIG. 1, this required less than a ten percent change in the $LO_2$ frequency. It is not problematic to specify a VCO having a ten percent greater width in frequency range.

At step 198, the switch points of the fractional-N synthesizers are determined. As previously noted, any fractional-N synthesizer will create structure spurs that can be avoided by properly selecting the range of permissible .f values. The frequencies to the two LO inputs 38 and 60 of the mixers can be relocated slightly when the .f value approaches an integer. This relocation is established in the selection of the frequency plan at step 200.

Once the frequency plan for the particular unit is selected, the controller 34 may be operated on the basis of the selection. The locations of the high-side and low-side mixing, as determined at steps 196 and 200, may be permanently set in non-volatile memory (e.g., flash memory) of the unit.

The process then returns to step 192 of selecting a different unit, if more than one unit was fabricated at step 190. This is repeated for each unit. Alternatively, if all of the circuits were fabricated in a single batch, it may be decided to use the same first IF for each circuit in the batch, but to calculate the center frequency of the first IF for each separate batch of circuits. With a unique $IF_1$, the appropriate frequencies for avoiding structure spurious responses can be calculated and the crossing spurs can be predicted and measured in order to verify specifications.

As will be recognized by persons skilled in the art, the process of FIG. 7 may be adapted for application to circuits and systems for which performance is enhanced by determining a frequency plan on the basis of actual IF filtering characteristics, rather than on the basis of IF filtering characteristics that were targeted during the design and fabrication of the circuits and systems.

What is claimed is:

1. A method of determining a frequency plan for a signal analysis circuit comprising:

fabricating said signal analysis circuit based on a selected design which is intended to achieve target circuit operation parameters in response to application of an intended frequency plan;

identifying actual filtering characteristics of a first intermediate frequency (IF) filter of said fabricated signal analysis circuit at least partially on a basis of detecting signals having been conducted through said first IF filter;

adjusting said intended frequency plan for said fabricated signal analysis circuit on a basis of said identified actual filtering characteristics, thereby defining an adjusted frequency plan; and storing said adjusted frequency plan as a permanent set for application to said fabricated signal analysis circuit.

2. The method of claim 1 wherein adjusting said intended frequency plan includes calculating a first local oscillator frequency ($LO_1$) on a basis of intended filtering characteristics, where said $LO_1$ is used to provide a first frequency conversion for an input signal prior to introduction to said first IF filter.

3. The method of claim 2 wherein:

identifying said intended filtering characteristics includes determining a center frequency ($IF_1$) of said first IF filter; and adjusting said frequency plan includes calculating a second local oscillator frequency ($LO_2$) which is used to provide a second frequency conversion at an output of said first IF filter, said calculating of said $LO_2$ being partially based on said determination of $IF_1$.

4. The method of claim 3 wherein said calculating of said $LO_2$ is further based on controlling passage of spurious responses, including identifying frequencies of internally generated spurious responses and selecting said $LO_2$ to filter said internally generated spurious responses using a second IF filter which follows said second frequency conversion.

5. The method of claim 4 wherein calculating said $LO_2$ includes selecting between setting $LO_2$ at $IF_1+IF_2$ or $IF_1-IF_2$, where said $IF_2$ is a center frequency of a passband of said second IF filter.

6. The method of claim 3 wherein:

each said first and said second frequency conversion is provided by a local oscillator-synthesizer pair in which a fractional-N synthesizer controls a local oscillator; and adjusting said frequency plan includes operating each said local oscillator-synthesizer pair to avoid spurious responses that are generated as said fractional-N synthesizers have N.f numbers that are approximately integers.

7. The method of claim 6 wherein operating each said local oscillator-synthesizer pair to avoid said spurious responses includes selecting local oscillator frequencies which are generated while said fractional-N synthesizers are outside of N.f ranges in which said N.f numbers are approximately integers.

8. A method of providing signal analysis capability comprising:

selecting a signal analysis circuit design which includes first and second frequency conversions to first and second intermediate frequencies (IFs), respectively, said analysis circuit design having target IF filter characteristics with respect to first IF filtering between said first and second frequency conversions, said target IF filter characteristics being consistent with target circuit operation parameters;

obtaining a signal analysis circuit fabricated on a basis of said signal analysis circuit design;

determining actual IF filter characteristics with respect to first IF filtering between said first and second frequency conversions of said signal analysis circuit; and selecting an actual circuit operation parameter for said signal analysis circuit, where differences between said target and actual circuit operation parameters are at least partially a consequence of a difference between said target and actual IF filter characteristics.

9. The method of claim 8 wherein:

determining said actual IF filter characteristics includes identifying a center frequency for a passband of said first IF filtering; and selecting said actual circuit operation parameters includes selecting a frequency plan.

10. The method of claim 9 wherein selecting said frequency plan includes determining a first local oscillator frequency for application in said first frequency conversion on a basis of said identified center frequency.

11. The method of claim 10 wherein selecting said frequency plan further includes determining a second local oscillator frequency for application in said second frequency conversion on a basis of said identified center frequency and on a basis of a selected target second IF at an output of said second frequency conversion.

12. The method of claim 11 wherein determining said second local oscillator frequency includes restricting possible frequencies to inhibit generations of spurious responses by fractional-N synthesis used in generating said second local oscillator frequency.

13. The method of claim 11 wherein determining said second local oscillator frequency includes selecting a frequency as a sum or difference between said identified center frequency and said selected target second IF.

14. The method of claim 8 wherein:

obtaining said signal analysis circuit includes fabricating a plurality of circuits based on said signal analysis circuit design; and determining said actual IF filtering characteristics and selecting said actual circuit operation parameters are repeated on an individual basis for each said circuit.

15. A method of providing signal analysis capability comprising:

fabricating a plurality of generally equivalent signal analysis circuits in accordance with a single circuit design, each said signal analysis circuit including first and second frequency conversions connected by a path that includes a first IF filter;

individually testing said signal analysis circuits to associate a specific center frequency with each said first IF filter of each said signal analysis circuit; and individually specifying a frequency plan for said signal analysis circuit such that each said frequency plan reflects said specific center frequency of said signal analysis circuit with which said frequency plan is specified.

16. The method of claim 15 wherein individually specifying said frequency plans uniquely associates each of said frequency plans with one of said signal analysis circuits.

17. The method of claim 15 wherein fabricating said signal analysis circuits includes manufacturing a batch of circuit boards in accordance with a uniform circuit design for spectrum analysis.

18. The method of claim 15 wherein individually specifying said frequency plans includes selecting operating frequencies on a basis of inhibiting passage of spurious responses to outputs of said signal analysis circuits.

19. The method of claim 18 wherein selecting said operating frequencies includes defining local oscillator frequencies for said first and second frequency conversions.

* * * * *